No. 645,547. Patented Mar. 20, 1900.
W. BÖTZ.
DRY GALVANIC ELEMENT.
(Application filed Apr. 1, 1899.)
(No Model.)
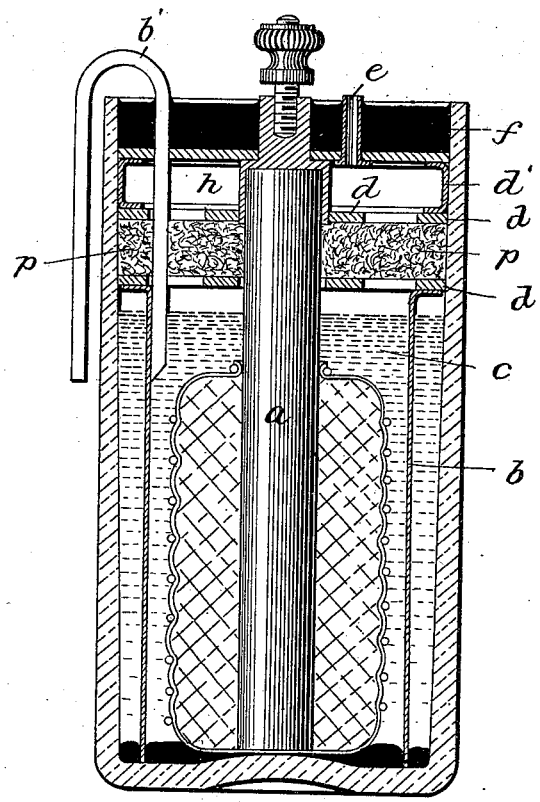
Witnesses
J. G. Hinkel
Arthur A. Fisher
Inventor
Wilhelm Bötz
by Foster Freeman
Attorneys

United States Patent Office.

WILHELM BÖTZ, OF LUDWIGSHAFEN, GERMANY, ASSIGNOR TO THE FIRM OF COLUMBUS ELECTRICITATSGESELLSCHAFT, GESELLSCHAFT MIT BESCHRÄNKTER HAFTUNG, OF SAME PLACE.

DRY GALVANIC ELEMENT.

SPECIFICATION forming part of Letters Patent No. 645,547, dated March 20, 1900.

Application filed April 1, 1899. Serial No. 711,428. (No model.)

*To all whom it may concern:*

Be it known that I, WILHELM BÖTZ, a subject of the Emperor of Germany, and a resident of Ludwigshafen-on-the-Rhine, Germany, have invented certain new and useful Improvements in Dry Galvanic Elements, of which the following is a specification.

The present invention relates to a so-called "dry" primary galvanic element—that is to say, a galvanic element having a thin or thick fluid electrolyte—being rendered able to be transported and having the advantage that its sealing allows the gases to escape, but not the electrolyte. This purpose is obtained by sealing or closing the element with a blanket saturated with oil, but so closed that between the electrolyte and the blanket an air-space remains. The oiled blanket has the effect of setting gases free at any time; but at ordinary pressure water or liquids are detained by it. When inside, as thus closed, element gases appear, they can escape through the cover without producing an overpressure, endangering the element.

If the element is held in a horizontal position, there need be no fear of the liquid escaping out of the element, because the hollow space above the liquid remains in contact with a part of the blanket, allowing the gases to escape without allowing them to drive the liquid by overpressure through the blanket.

At some distance above the blanket, in order to protect the latter, a cobbler's-wax sealing or closing is arranged, supported by a disk of cork or the like. Through this cobbler's-wax closing a small pipe is passed, allowing the gases passed through the blanket to escape.

The blanket is best supported by the bent top border of the zinc electrode and held away from the cobbler's-wax closing by a ring of suitable material, or other convenient modes for supporting the blanket and wax closing device may be used.

In the annexed drawing, as an example, a pile according to my invention is represented in vertical cross-section.

The oiled blanket $p$ is held by two rings $d$. A third ring $d'$ supports the cobbler's-wax sealing $f$. Through the latter passes a little tube $e$. The carbon electrode $a$ and the terminal $b'$ of the zinc electrode $b$ pass also through the cobbler's-wax sealing and, too, through the oiled blanket $p$. Between the electrolyte $c$ and the cover $p$ is a free air-space. A like free air-space exists between $p$ and $f$.

The chemicals used in this battery may vary, according to the requirements; but in the battery illustrated the electrode $a$ is surrounded by peroxid of manganese, and the electrolyte consists of a solution of chlorid of ammonium, which may be thickened with tragacanth. A layer of pitch may be placed in the bottom of the jar to protect the same and form a support for the elements.

I claim—

1. A dry galvanic element having a fluid electrolyte and being closed by a seal, consisting of a porous substance impregnated with oil, whereby the element is completely closed to the passage of the electrolyte, while permitting gas to escape at ordinary pressure, substantially as described.

2. A galvanic element comprising a jar holding the electrodes and the electrolyte, rings arranged above the electrolyte, a seal consisting of a porous substance impregnated with oil supported in the rings, a wax closure to the jar, an air-tube through the closure, and an air-space between the seal and the electrolyte, substantially as described.

In testimony whereof I have signed my name to this specification in the presence of two subscribing witnesses.

WILHELM BOTZ.

Witnesses:
CARL GOEZ,
FERD. THYS.